US011471805B2

(12) United States Patent
Murthy et al.

(10) Patent No.: US 11,471,805 B2
(45) Date of Patent: Oct. 18, 2022

(54) EXTERNAL BRACE REINFORCEMENT STRUCTURE FOR IMPROVED STRENGTH AND PERFORMANCE OF PRIMARY FILTER ELEMENT

(71) Applicant: CUMMINS FILTRATION IP, INC., Columbus, IN (US)

(72) Inventors: Aditya S. Murthy, Madison, WI (US); Peter K. Herman, Stoughton, WI (US); Scott W. Schwartz, Cottage Grove, WI (US); Robert A. Bannister, Ames, IA (US); Jason A. Scherck, Madison, WI (US); Yashpal Subedi, Madison, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 253 days.

(21) Appl. No.: 16/494,526

(22) PCT Filed: Mar. 14, 2018

(86) PCT No.: PCT/US2018/022354
§ 371 (c)(1),
(2) Date: Sep. 16, 2019

(87) PCT Pub. No.: WO2018/170075
PCT Pub. Date: Sep. 20, 2018

(65) Prior Publication Data

US 2021/0121806 A1 Apr. 29, 2021

Related U.S. Application Data

(60) Provisional application No. 62/472,803, filed on Mar. 17, 2017.

(51) Int. Cl.
*B01D 46/00* (2022.01)
*B01D 46/12* (2022.01)
*B01D 46/121* (2022.01)

(52) U.S. Cl.
CPC ....... *B01D 46/0005* (2013.01); *B01D 46/121* (2022.01); *B01D 2265/028* (2013.01); *B01D 2265/06* (2013.01)

(58) Field of Classification Search
CPC .............. B01D 46/0005; B01D 46/125; B01D 2265/028; B01D 2265/06
(Continued)

(56) References Cited

U.S. PATENT DOCUMENTS

2004/0139707 A1 7/2004 Gillingham et al.
2007/0157589 A1* 7/2007 Haberkamp ......... B01D 46/522 55/498

(Continued)

FOREIGN PATENT DOCUMENTS

WO WO-2016/040332 3/2016
WO WO-2016/045730 3/2016
WO WO-2016040332 A1 * 3/2016 ........... B01D 46/106

OTHER PUBLICATIONS

International Search Report and Written Opinion issued for PCT/US2018/022354, dated May 11, 2018, 10 pages.

*Primary Examiner* — Robert A Hopkins
*Assistant Examiner* — Qianping He
(74) *Attorney, Agent, or Firm* — Foley & Lardner LLP

(57) ABSTRACT

An external brace for a filter element is described. The brace is configured to wrap around an exterior of a filter element having a filter media pack. The brace helps to support the filter media pack during filtering operations by preventing outward flexing of the filter media pack caused by fluid flowing through the filter media. In some arrangements, the (Continued)

718
712
714
702 brace interfaces with a filtration system housing to provide additional support to the filter element.

20 Claims, 11 Drawing Sheets

(58) Field of Classification Search
USPC ........................................................... 55/497
See application file for complete search history.

(56) References Cited

U.S. PATENT DOCUMENTS

| | | | | |
|---|---|---|---|---|
| 2008/0011672 | A1 | 1/2008 | Schwartz et al. | |
| 2012/0055127 | A1 | 3/2012 | Holzmann et al. | |
| 2012/0067013 | A1* | 3/2012 | Antony | B01D 46/4227<br>55/357 |
| 2014/0014597 | A1* | 1/2014 | Knight | B01D 29/50<br>210/806 |
| 2018/0117515 | A1* | 5/2018 | Hugues | B01D 46/0002 |

* cited by examiner

EXTERNAL BRACE REINFORCEMENT STRUCTURE FOR IMPROVED STRENGTH AND PERFORMANCE OF PRIMARY FILTER ELEMENT

CROSS REFERENCE TO RELATED APPLICATIONS

The present application is a national stage of PCT Application No. PCT/US2018/022354, filed Mar. 14, 2018 which claims the benefit of priority to U.S. Provisional Patent Application No. 62/472,803, filed Mar. 17, 2017. The contents of both applications are incorporated herein by reference in their entirety and for all purposes.

TECHNICAL FIELD

The present application relates to filter elements.

BACKGROUND

Internal combustion engines generally combust a mixture of fuel (e.g., gasoline, diesel, natural gas, etc.) and air. Prior to entering the engine, the intake air is typically passed through a filtration system to remove contaminants (e.g., dust, water, oil, etc.) from the intake air. The filtration system includes a filter element having filter media. As the air passes through the filter media of the filter element, the filter media removes at least a portion of the contaminants in the air thereby preventing unwanted contaminants from entering the internal combustion engine.

Panel-type air filter elements are often used in air filtration systems for automotive applications. The panel-type air filter elements typically comprise pleated filter media arranged in a panel. In some filter elements, two panels are positioned in a V-shape and air to be filtered flows into the V-shape, through the panels, and out of the filter element in an inside-out manner. Depending on the size of the panels, the air flowing through the filter element may cause the filter media panels to bow or flex. When the filter media panels are bowed or flexed, the panels are more susceptible for tearing or rupturing. Additionally, the bowed or flexed filter media panels may exhibit a higher restriction or pressure drop.

SUMMARY

Various example embodiments relate to a brace for supporting filter media packs of a filter element and a filter element having such a brace. One such example embodiment relates to a brace. The brace comprises a frame defining a central opening configured to receive a filter element. The central opening is defined by a length, a width, and a height. The length is larger than the width, and the width is larger than the height. The brace further comprises a stabilizer extending from the frame and away from the central opening. The stabilizer is configured to interact with a filtration system housing to help stabilize the filter element within the filtration system housing.

Another example embodiment relates to a filter element. The filter element comprises a first filter media pack and a filter frame coupled to the first filter media pack. The filter element further comprises a brace comprising a frame defining a central opening. The first filter media pack is received in the central opening such that the frame surrounds the first filter media pack.

A further example embodiment relates to a filter element. The filter element comprises a first filter media pack and a second filter media pack. The filter element further comprises a filter frame coupled to the first filter media pack and the second filter media pack. The filter frame securing the first filter media pack and the second filter media pack in a V-shape defining a central outlet between opposing inner faces of the first filter media pack and the second filter media pack. The filter element comprises a brace extending between the opposing inner faces of the first filter media pack and the second filter media pack.

Another example embodiment relates to a filter element. The filter element comprises a first endcap, a second endcap, and a cylindrical filter media pack positioned between and coupled to the first endcap and the second endcap. The filter element further comprises a brace comprising a frame defining a central opening. The cylindrical filter media pack is received in the central opening such that the frame surrounds the cylindrical filter media pack.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, an external brace for a filter element is described. The brace is configured to wrap around an exterior of a filter element having a filter media pack. The brace helps to support the filter media pack during filtering operations by preventing outward flexing of the filter media pack caused by fluid flowing through the filter media. In some arrangements, the brace interfaces with a filtration system housing to provide additional support to the filter element.

Figure 1:
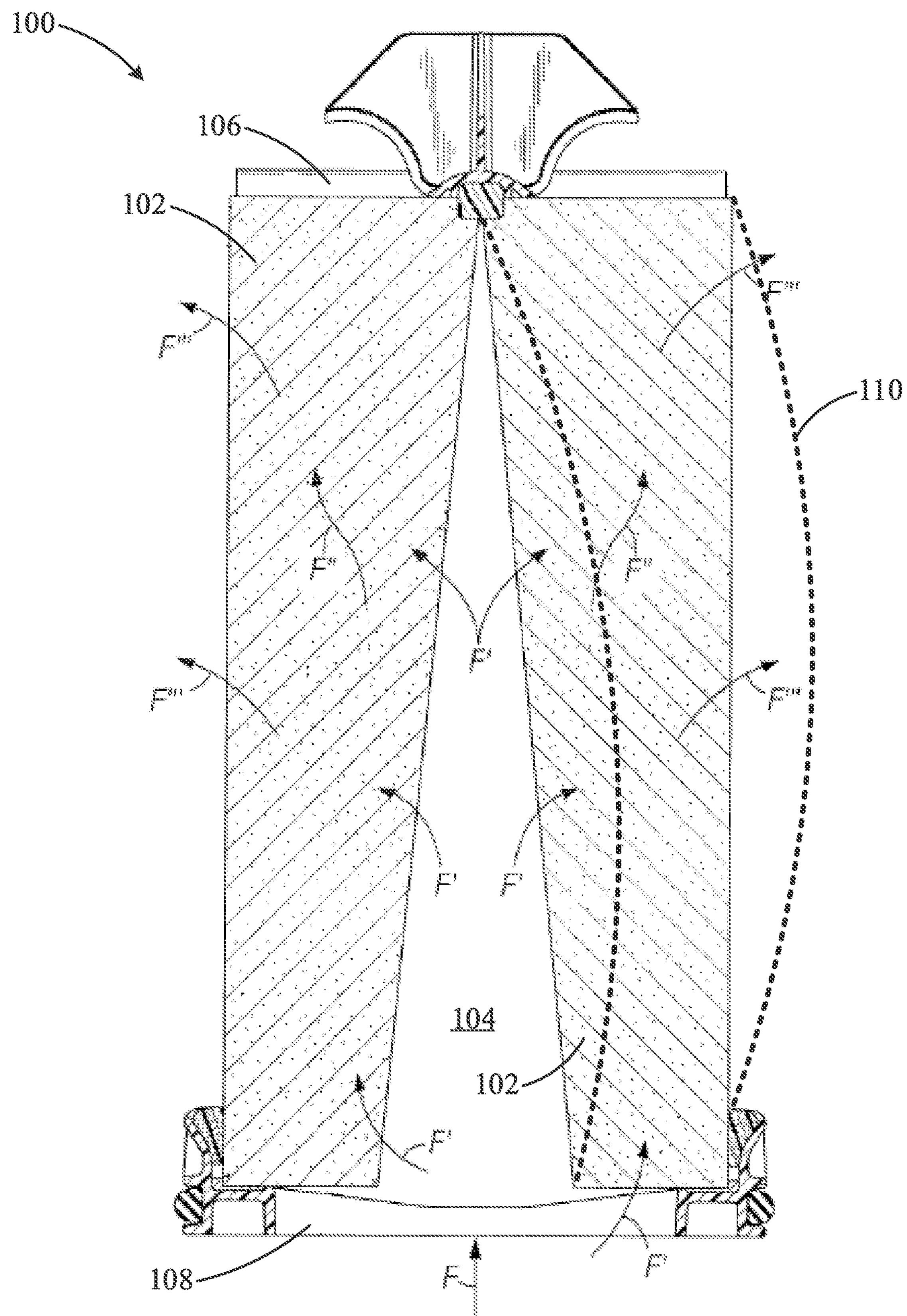
FIG. 1 shows a cross-sectional view of a filter element.

Referring to FIG. 1, a cross-sectional view of a filter element 100 is shown. The filter element 100 is a V-shaped filter element of a known arrangement. One such filter element is described in US Patent Application Publication No. 2012/0055127, entitled "FILTER AND FILTER MEDIA HAVING REDUCED RESTRICTION," by Holzmann et al., which is herein incorporated by reference in its entirety and for all purposes. The filter element generally includes two opposing filter media packs 102. The filter media packs 102 may be, for example, pleated filter media packs. The filter media packs 102 are arranged in a V-shape defining a central inlet area 104 between opposing inner faces of the two filter media packs 102. A top frame 106 and a bottom frame 108 secure the filter media packs 102 in the V-shape.

As shown by the flow arrows F, F', F" and F"', air to be filtered flows through the bottom frame 108 (e.g., through an inlet opening in the bottom frame 108), into the central inlet area 104, through the filter media packs 102, and out of the filter media packs 102. Accordingly, the filter element 100 is an inside-out flow filter element. During operation, the air flowing through the filter media packs 102 may cause the filter media packs 102 to bow (i.e., flex, bend, etc.), which is shown by the dashed lines 110. When the filter media packs 102 bow, the filter media comprising the filter media packs 102 is more susceptible to tearing or breaking and can exhibit increased pressure drop across the filter media packs 102.

Figure 2:
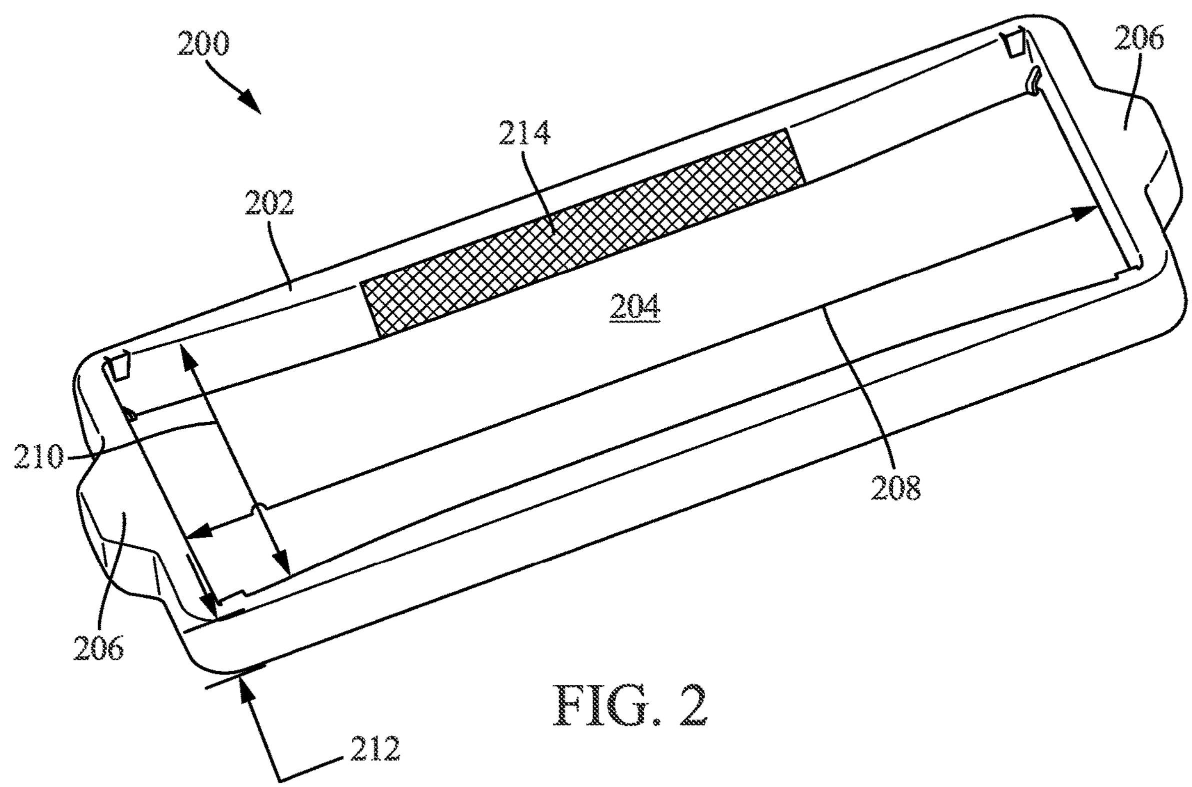
FIG. 2 shows a perspective view of a brace according to an example embodiment.
Figure 3:
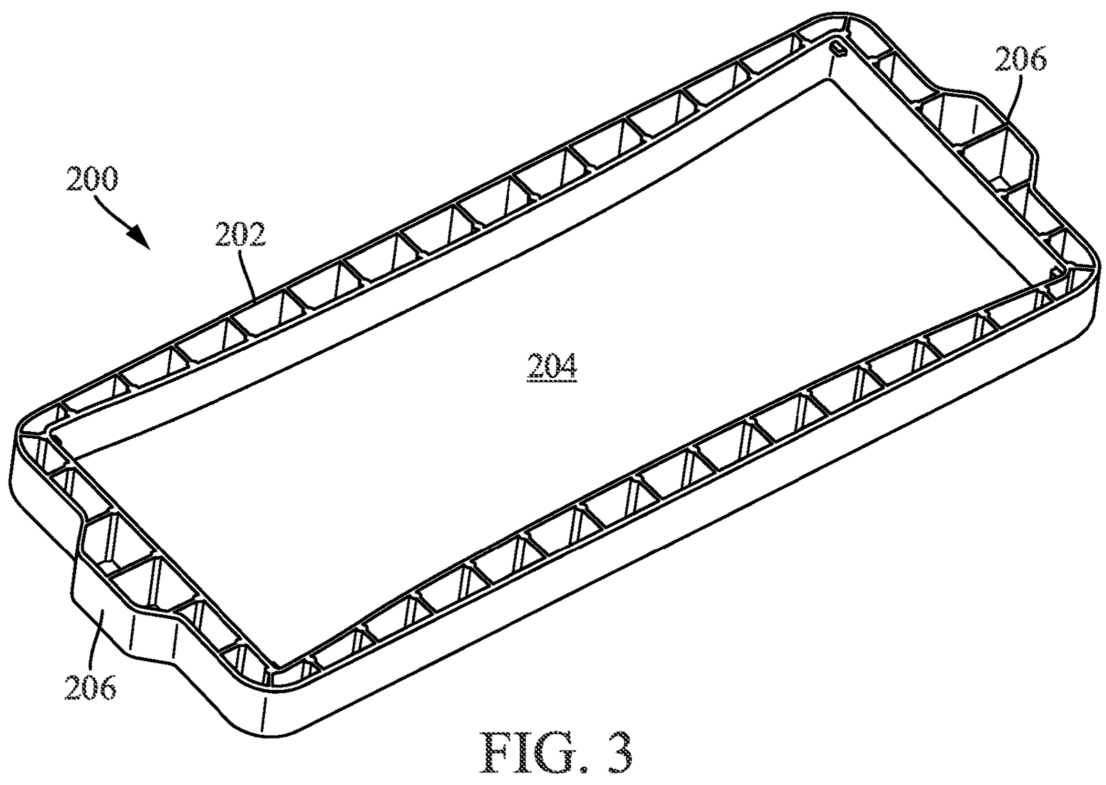
FIG. 3 shows another perspective view of the brace of FIG. 2.
Figure 4:
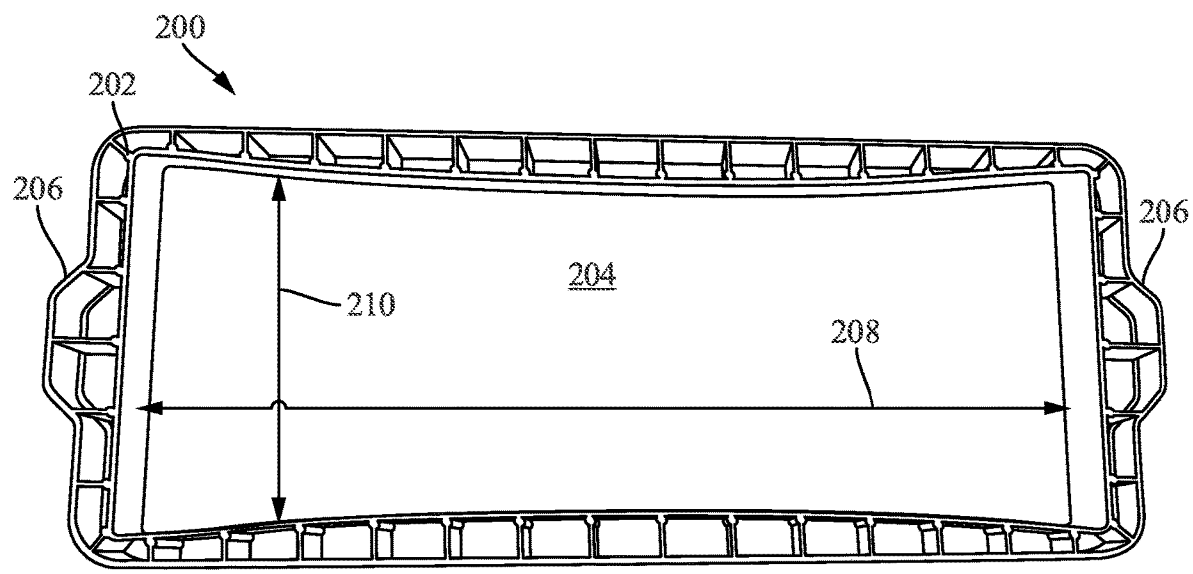
FIG. 4 shows a top view of the brace of FIG. 2.
Figure 5:
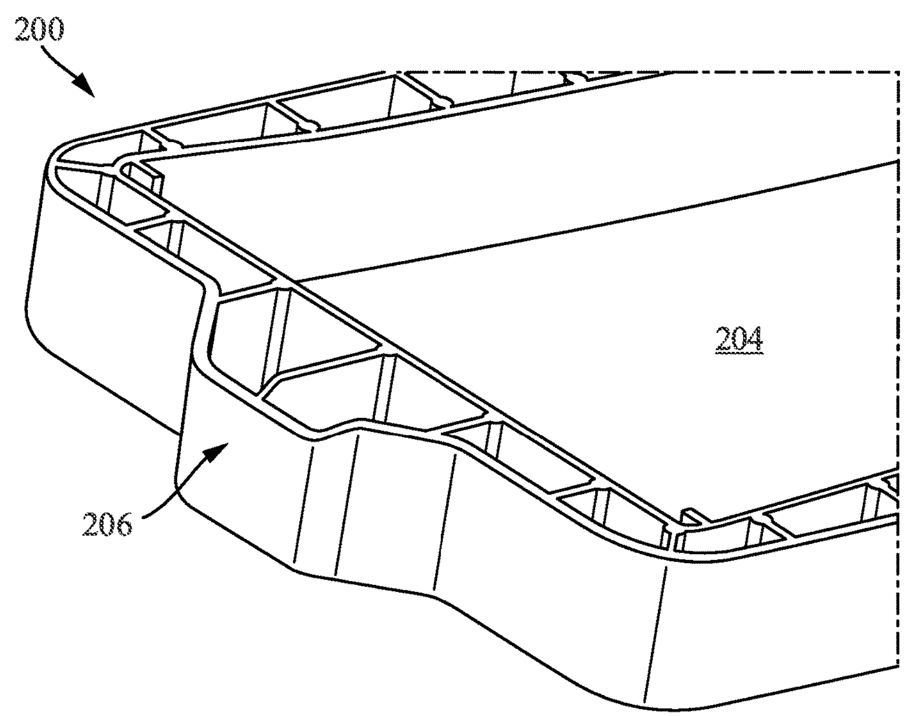
FIG. 5 shows a close-up side perspective view of a stabilizer of the brace of FIG. 2.

Referring to FIGS. 2-6, various views of a brace 200 are shown according to an example embodiment. As described in further detail below, the brace 200 is configured to wrap around and circumscribe at least a portion of a filter element, such as the filter element 100, to prevent the filter media packs of the filter element from bowing. FIGS. 2 and 3 each show different perspective views of the brace 200. FIG. 4 shows a top view of the brace 200. FIG. 5 shows a close-up side perspective view of a stabilizer 206 of the brace 200. FIG. 6 shows a close-up perspective view of locking features of the brace 200.

As shown in FIGS. 2-6, the brace 200 is comprised of a frame 202 that defines a central opening 204. In some arrangements, the frame 202 is made from injection molded plastic. As described in further detail below (e.g., with respect to FIGS. 8 and 9), the central opening 204 is configured to receive a filter element (e.g., the filter element 100). The frame includes stabilizers 206. The stabilizers 206 extend from the frame away from the central opening 204. The stabilizers 206 on opposite sides of each other. As described in further detail below (e.g., with respect to FIGS. 5 and 8), the stabilizers 206 are configured to interact with a housing to help stabilize the filter element within the housing. In some arrangements, the frame 202 may include a plurality of flow passages extending through the frame thereby reducing the amount of area of the filter media packs 102 masked off by the frame 202.

In the embodiment depicted in FIGS. 2-6B, the central opening 204 is substantially rectangular in shape. The central opening 204 is defined by a length 208, a width 210, and a height 212. In some arrangements, the length 208 is larger than the width 210. The width 210 of the central opening 204 varies across the length 208. In some arrangements, the width 210 is the smallest at the center of the length 208. The narrowing width 210 from an edge of the central opening 204 to the center of the central opening 204 provides a contact zone 214 that contacts and supports the filter media packs of the filter element. The height 212 is selected to both minimize the masking off of surface area of the filter media packs while still providing an appropriate amount of surface area to support the filter media packs during use. For example, if the height 212 is too large, it will block too much flow through the filter media packs, and if the height 212 is too small, it will provide a bending point for the filter media packs. The height 212 can be customized depending on the rigidity of the filter media making up the filter media packs.

Figure 6A:
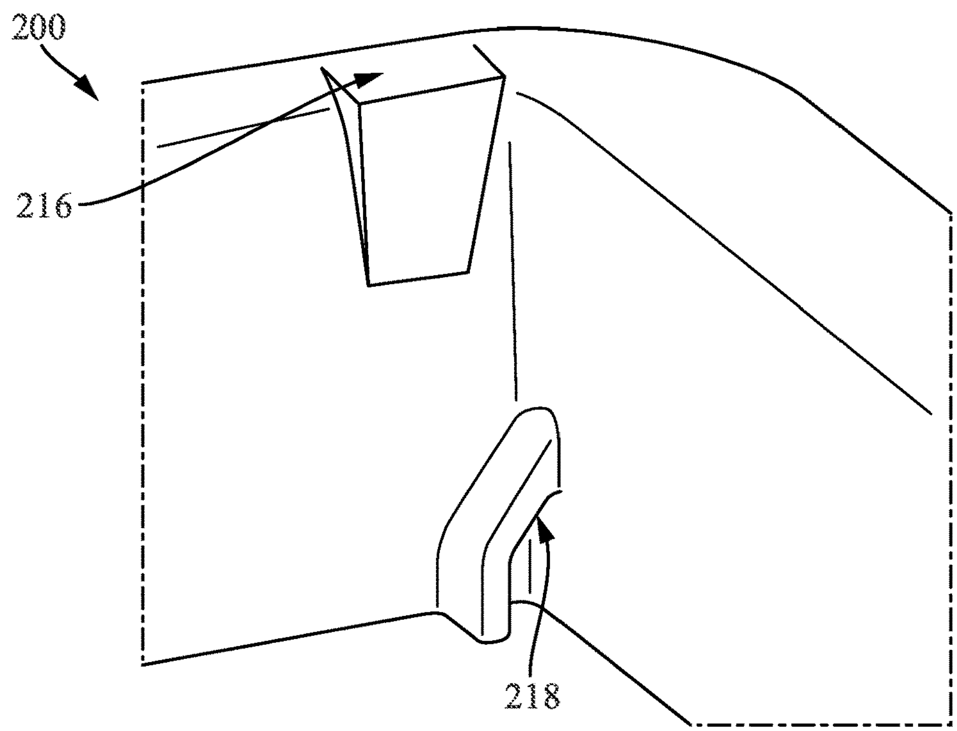
FIG. 6A shows a close-up perspective view of locking features of the brace of FIG. 2.
Figure 6B:
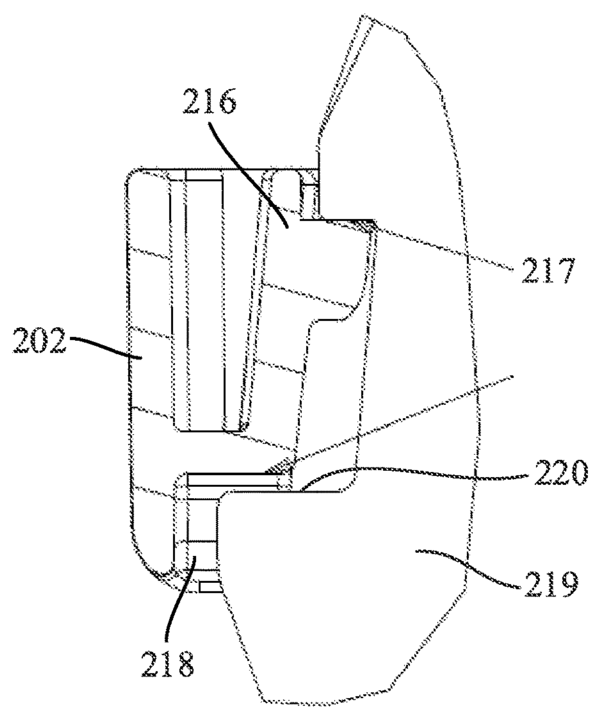
FIG. 6B shows a cross-sectional view of the locking features of FIG. 6A engaging with a side panel of a filter element.

As shown best in FIGS. 6A and 6B, the frame 202 of the brace 200 includes a snap feature 216 and a groove 218. The snap feature 216 and the groove 218 are positioned on an inside of the frame 202 projecting towards the central opening 204. The snap feature 216 is configured to interact with a first notch 217 of a side panel 219 of a filter element by forming a snap-fit connection with the side panel to secure the brace 200 to the filter element as shown in FIG. 6B. The snap feature 216 may be positioned at a point along the length 208 of the frame 202 adjacent to the intersection of the length 208 and width 210 of the frame 202. In other embodiments, the snap feature 216 may be positioned at a point along the width 210 of the frame 202 adjacent to the intersection of the length 208 and width 210 of the frame 202. As shown in FIG. 6A, the snap feature 216 is positioned towards a top end of the frame 202. The groove 218 is configured to receive a second notch 220 of the side panel 219 of the filter element to further secure the brace 200 to the filter element as shown in FIG. 6B. The groove 218 may be positioned at a point along the length 208 of the frame 202 adjacent to or at the intersection of the length 208 and width 210 of the frame 202. In other embodiments, the groove 218 may be positioned at a point along the width 210 of the frame 202 adjacent to the intersection of the length 208 and width 210 of the frame 202. As shown in FIG. 6A, the groove 218 is positioned towards a bottom end of the frame 202. As will be appreciated, the snap feature 216 and groove interface with the filter element to provide additional rigidity and impede deformation of the filter element.

Figure 7:
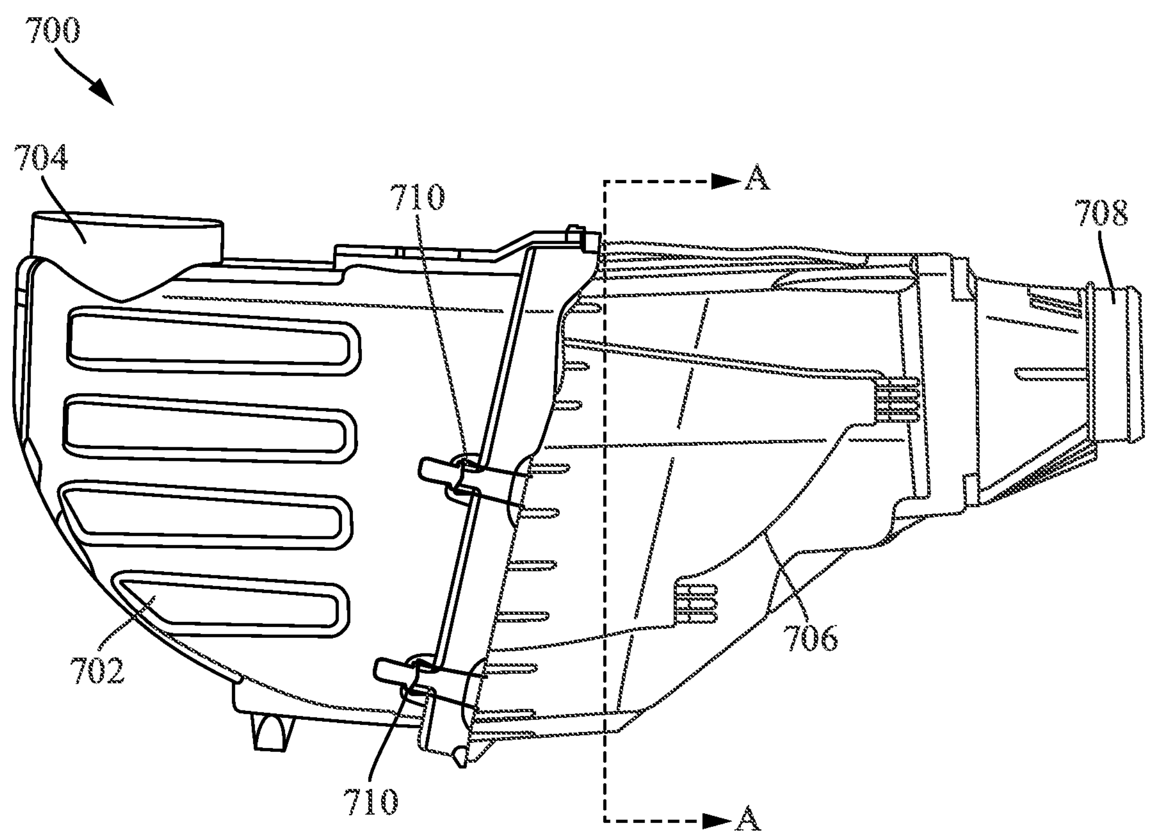
FIG. 7 shows a perspective view of a filtration system according to an example embodiment.

The use of the brace 200 with a filter element is described below with respect to FIGS. 7 through 10. Referring to FIG. 7, a view of a filtration system 700 is shown according to an example embodiment. The filtration system includes a housing having a base 702 with an inlet 704 and a cover 706 with an outlet 708. The cover 706 is removably secured to the base 702 through latches 710. Generally, the base 702 and the cover 706 form a compartment that receives a filter element 712 (shown in FIGS. 8-10).

Figure 8:
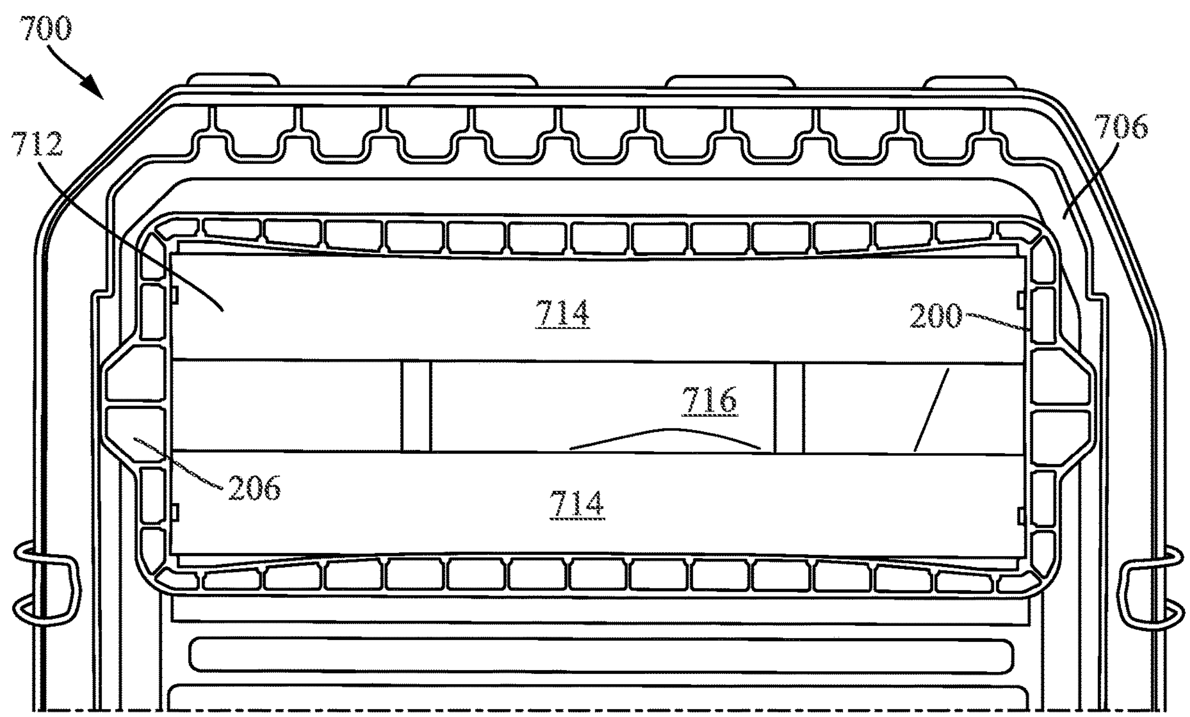
FIG. 8 shows a cross-sectional view of the filtration system of FIG. 7.
Figure 9:
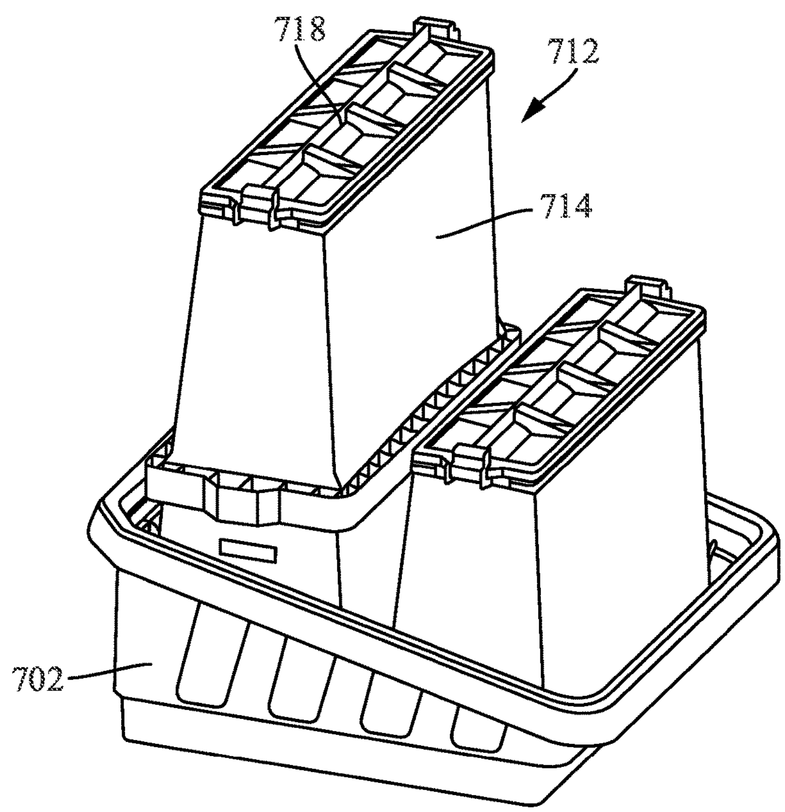
FIG. 9 shows a perspective view of a filter element installed in a base of the filtration system of FIG. 7.

FIG. 8 shows a cross sectional view of the filtration system 700 taken along segment A-A. As shown in FIG. 8, the filter element 712 is installed in the filtration system 700. FIG. 9 shows a perspective view of the filter element 712 installed in the base 702. The filter element 712 is similar to the filter element 100. Accordingly, the filter element 712 includes two opposing filter media packs 714. The filter media packs 714 may be, for example, pleated filter media packs. The filter media packs 714 are arranged in a V-shape defining a central inlet area 716 between opposing inner faces of the two filter media packs 714. A top frame 718 and a bottom frame (not shown) secure the filter media packs 714 in the V-shape. The distance between the top frame 718 and the bottom frame define a height of the filter element 712. The filter brace 200 is installed on the filter element 712. The brace 200 is installed within the middle third of the height of the filter element 712. In some arrangements, the brace 200 is installed at the midpoint of the height of the filter element 712. The stabilizers 206 of the brace 200 are contacting the interior wall of the cover 706 to stabilize the filter element 712 within the filtration system 700. The stabilizer 206 reduce the vibrations caused by air passing through the filter element 712.

Figure 10:
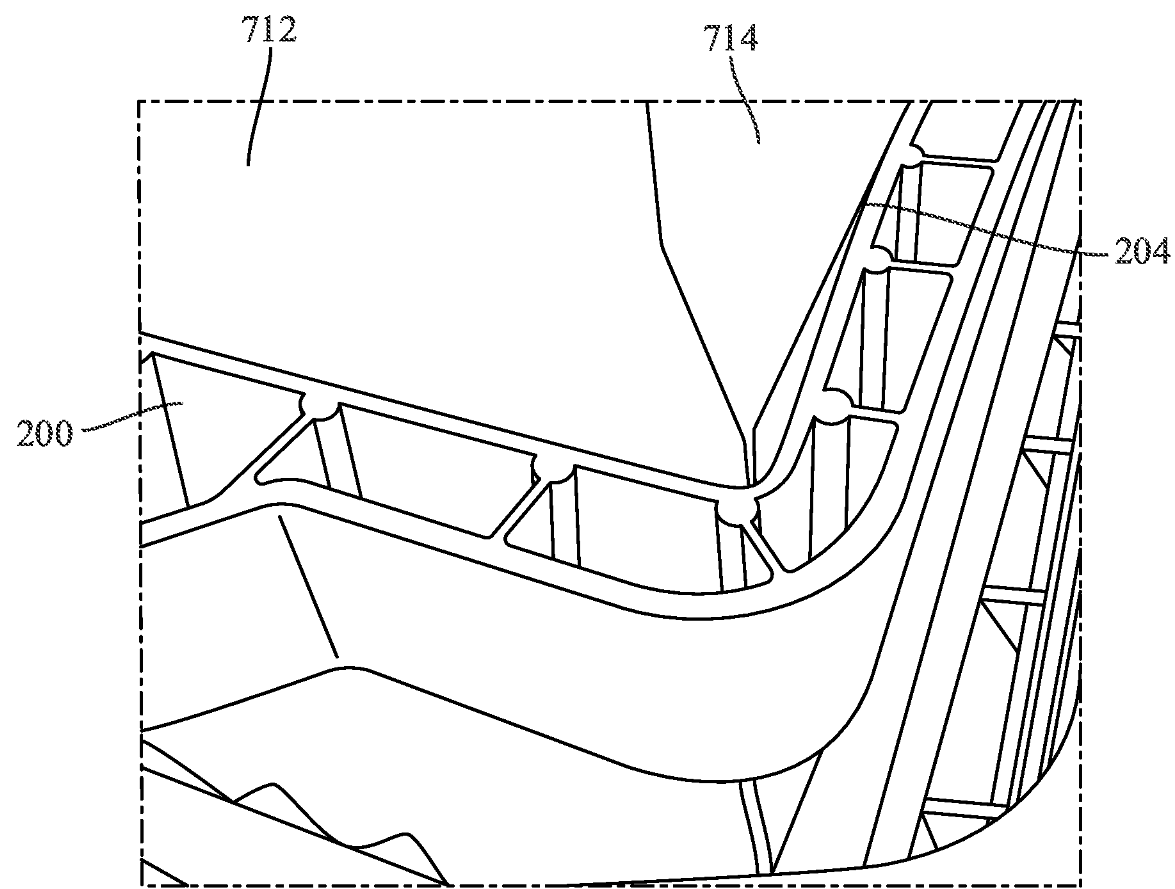
FIG. 10 shows a close-up perspective view of the brace of FIG. 2 mounted on the filter element of the filtration system of FIG. 7.

Referring to FIG. 10, a close-up perspective view of the brace 200 mounted on the filter element 714 is shown. As shown in FIG. 10, the central compartment 204 is configured to receive the filter element 712 and support the filter media packs 714. The brace 200 provides hoop strength to the filter element 712 thereby preventing the filter media packs 714 from bowing an excessive amount.

The above-described brace 200 can be customized to fit any number of filter applications. For example, the brace 200 can be modified such that the central compartment 204 is rounded to support cylindrical or racetrack shaped filter elements. Additionally, the brace 200 can be customized to include multiple central compartments 204 to support multiple side-by-side filters (e.g., to additionally support the filter element adjacent to the filter element 712 in FIG. 9). Additionally, the brace 200 can be reused for multiple filter elements.

Figure 12:
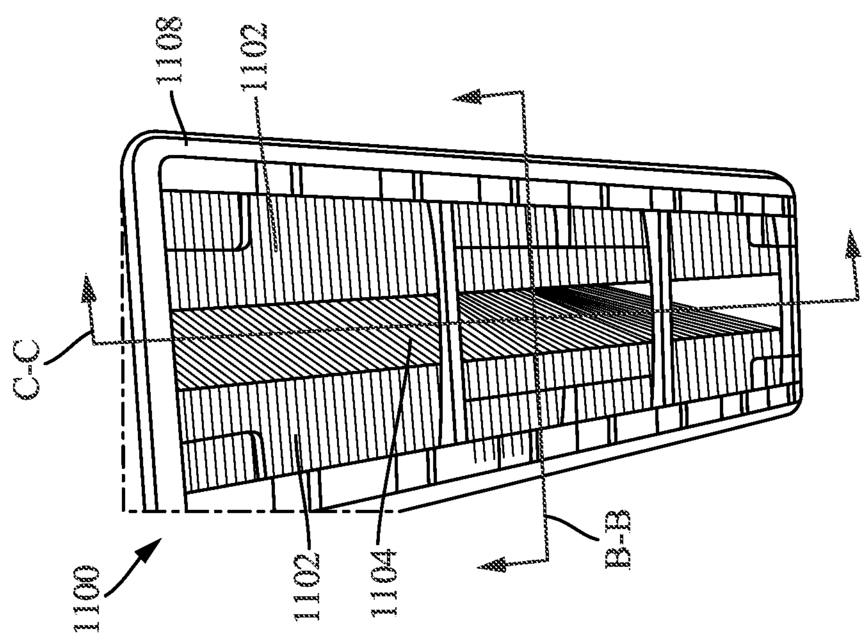
FIG. 11 and FIG. 12 each show a different perspective view of a filter element according to an example embodiment.
Figure 11:
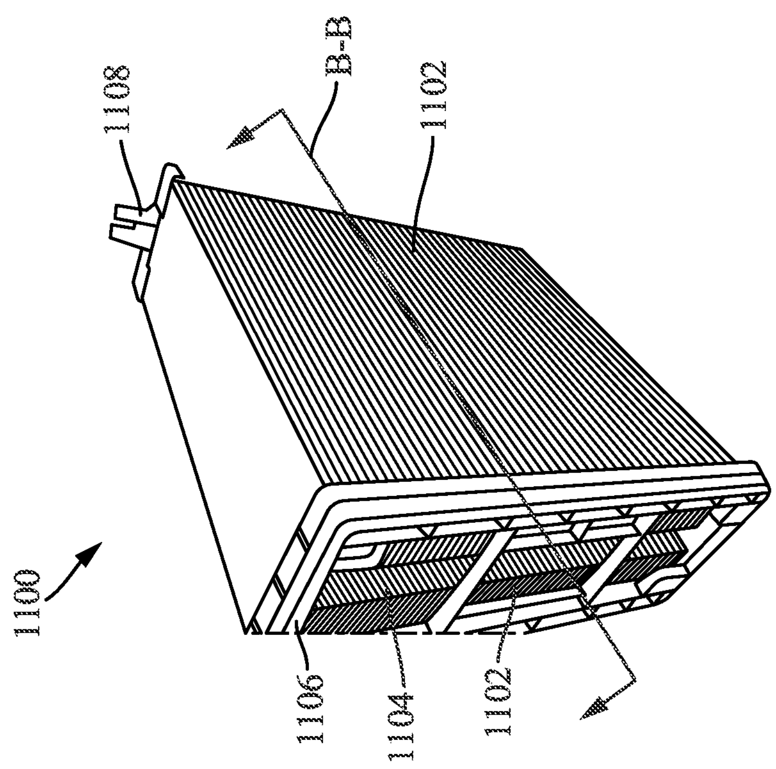
Figure 13:
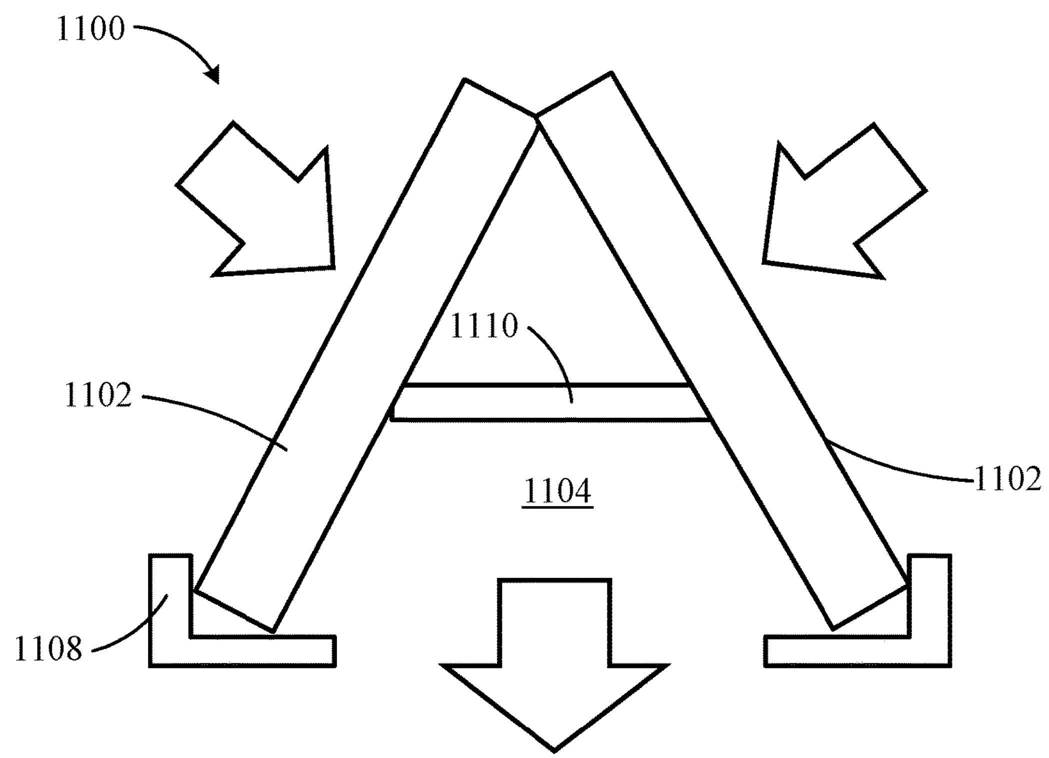
FIG. 13 and FIG. 14 each show a different cross-sectional view of the filter element of FIGS. 11 and 12.

Referring to FIGS. 11 and 12, two different perspective views of a filter element 1100 are shown according to an example embodiment. The filter element 1100 is similar to the filter element 712 of FIGS. 8, 9, and 10. One of the differences between the filter element 1100 and the filter element 712 is that the filter element 1100 is an outside-in flow filter element. The filter element 1100 includes two opposing filter media packs 1102. The filter media packs 1102 may comprise, for example, pleated filter media packs. The filter media packs 1102 are arranged in a V-shape defining a central outlet area 1104 between opposing inner faces of the two filter media packs 1102. A top frame 1106 and a bottom frame 1108 secure the filter media packs 1102 in the V-shape. The distance between the top frame 1106 and the bottom frame 1108 define a height of the filter element 1100. Generally, air to be filtered flows from an outside of the V-shape, into and through the filter media packs 1102, and out the central outlet area 1104. Since air flow through the filter element 1100 is outside-in, the filter media packs 1102 may bow inwards potentially collapsing the V-shape and the central outlet area 1104. Accordingly, to prevent or limit the inward bowing of the filter media packs 1102, the filter element includes an inner frame member 1110 as shown in FIG. 13.

Figure 14:
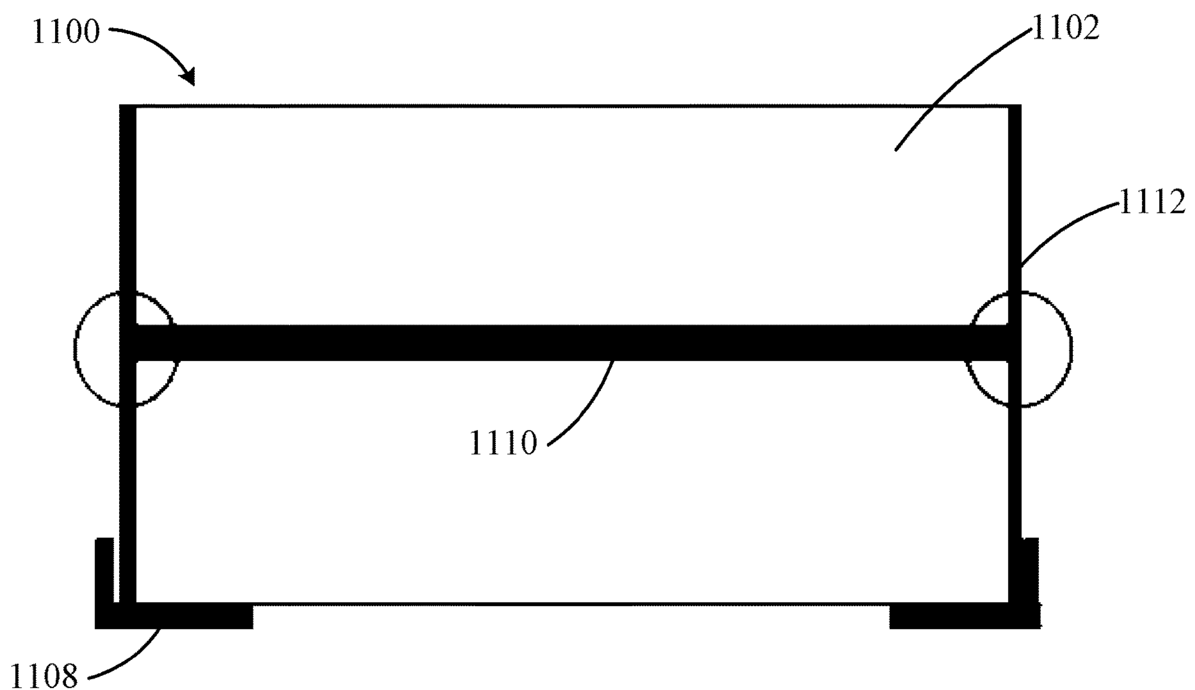

The inner frame member 1110 is similar to the frame 202 of the brace 200 of FIGS. 2-10. A difference between the inner frame member 1110 and the frame 202 is the inner frame member 1110 is positioned within the central outlet area 1104 and braces the opposing filter media packs 1102 to prevent the filter media packs 1102 from bowing inward. Similarly, end panels (e.g., stabilizers) may be used to support the inner frame member 1110. Referring to FIG. 13, a cross-sectional view of the filter element 1100 taken along section B-B of FIG. 11 and FIG. 12 is shown. Referring to FIG. 14, a cross-sectional view of the filter element 1100 taken along section C-C of FIG. 12 is shown. FIGS. 13 and 14 show the inner frame member 1110. As shown in FIGS. 13 and 14, the inner frame member 1110 is positioned within the central outlet area 1104 and braces the opposing filter media packs 1102 to prevent the filter media packs 1102 from bowing inward (or to reduce the amount of bowing). In some arrangements, the inner frame member 1110 is supported by the end panels 1112 of the filter element 1000.

Figure 15:
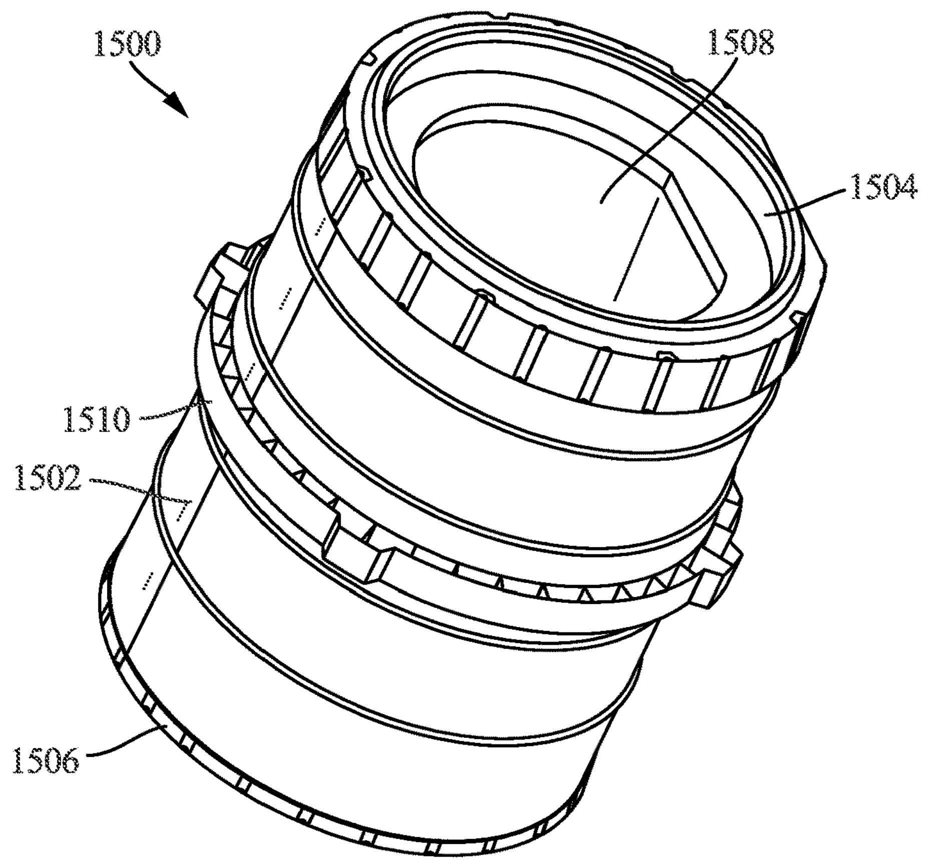
FIG. 15 shows a perspective view of a filter element according to another example embodiment.
Figure 16:
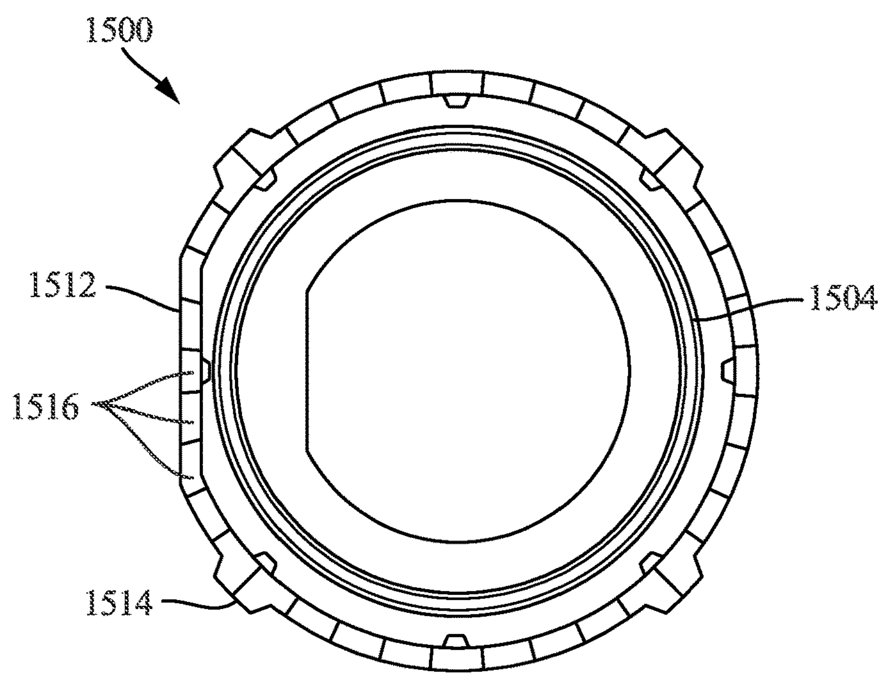
FIG. 16 shows a top view of the filter element of FIG. 15.
Figure 17:
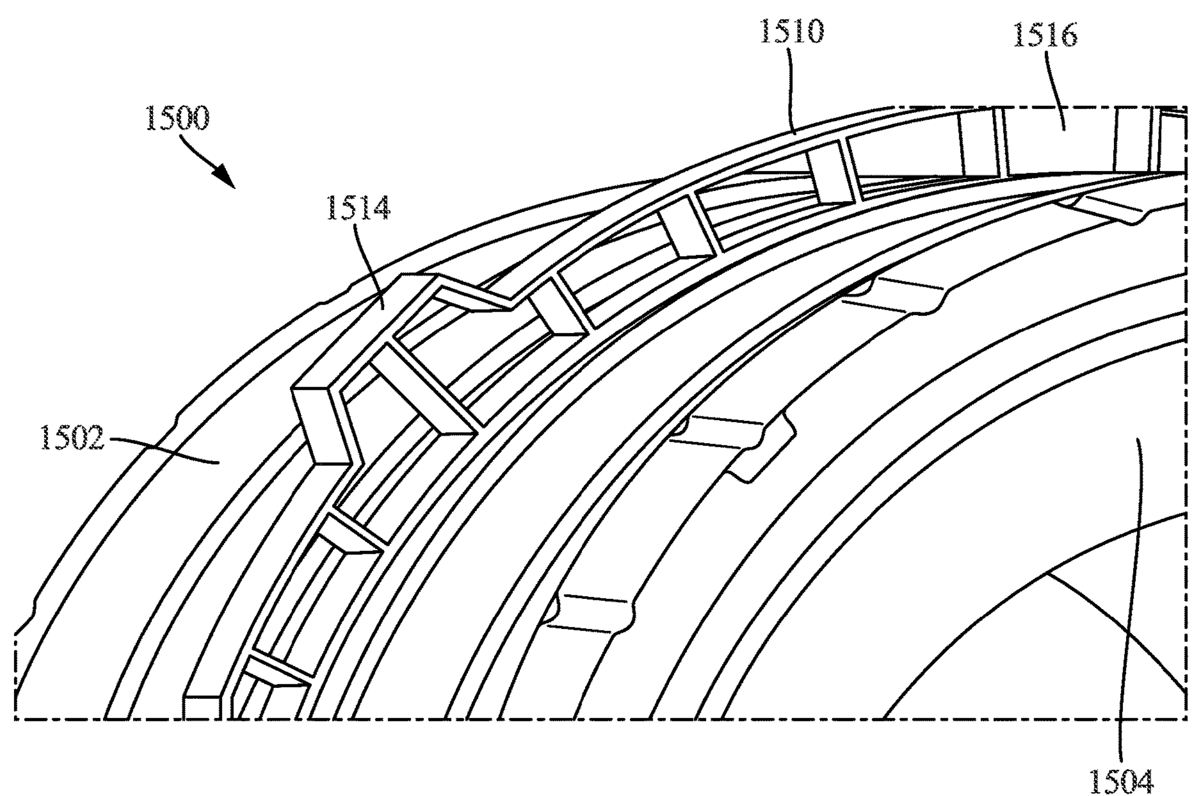
FIG. 17 shows a close-up perspective view of the filter element of FIG. 15.

Referring to FIGS. 15-17, views of a filter element 1500 are shown according to an example embodiment. FIG. 15 shows a perspective view of the filter element 1500. FIG. 16 shows a top view of the filter element 1500. FIG. 17 shows a close-up perspective view of the filter element 1500. The filter element 1500 is a cylindrical filter element (for example, having a circular, oval or racetrack-shaped cross section) and generally comprises a hollow cylinder of filter media 1502, a first endcap 1504, and a second endcap 1506. The first endcap 1504 is an open endcap and includes an inlet 1508. The second endcap 1506 is a closed endcap. Fluid to be filtered, such as air, flows into the filter element 1500 through the inlet 1508 in the first endcap 1504, into a central volume defined by the filter media 1502, and through the filter media 1502. As the fluid flows through the filter media 1502, the force of the fluid against the filter media 1502 may cause the filter media 1502 to bow or flex outward (away from a central axis of the filter element 1500).

The filter element includes a support brace 1510 comprising a central opening. The support brace 1510 is similar to the brace 200 of FIGS. 2-10. A difference between the support brace 1510 and the brace 200 is the support brace 1510 is substantially cylindrical in shape and not rectangular as with the brace 200. Similarly, the support brace 1510 supports the filter media 1502 during filtering operations thereby limiting the amount of bowing or flexing experienced by the filter media 1502. Accordingly, like numbering is used to designate similar components between the support brace 1510 of the filter element 1500 and brace 200 of the filter elements. The support brace 1510 wraps around an outer surface of the filter media 1502 such that the filter media 1502 is received within the central opening. The support brace 1510 includes a frame 1512 comprising a plurality of support tabs 1514. The support tabs 1514 are configured to contact a filtration system housing when the filter element 1500 is installed in the filtration system housing. The support tabs 1514 support and align the filter element 1500 within the filtration system housing. The frame 1512 includes a plurality of openings 1516 that reduce the weight and cost of the frame support brace 1510.

The support brace 1510 is installed on the filter element 1500. The support brace 1510 is installed at the midpoint of the height of the filter element 1500. In some arrangements, the support brace 1510 is installed within the middle third of the height of the filter element 1500. The support tabs 1514 of the support brace 1510 contact an interior wall of a cover of similar feature to stabilize the filter element 1500 within the filtration system. The support tabs 1514 reduce the vibrations caused by air passing through the filter element 1500. As shown in FIG. 16, the support brace 1510 may include a substantially straight portion on a side of the substantially cylindrical shape of the support brace 1510 to accommodate a specific filter element 1500 and/or filtration system design. In some embodiments, the support brace 1510 may include a snap feature and groove similar to the snap feature 216 and groove 218 of the brace 200. The snap feature of support brace is configured to interact with a notch or a side panel of the filter element 1500 by forming a snap-fit connection with the side panel to secure the support brace 1510 to the filter element 1500. The groove of the support brace 1510 is configured to receive a second notch or the side panel of the filter element 1500 to further secure the support brace 1510 to the filter element 1500.

It should be noted that any use of the term “example” herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element comprising:

a first filter media pack;

a filter frame coupled to the first filter media pack; and a brace comprising a frame defining a central opening, the first filter media pack received in the central opening such that the frame surrounds the first filter media pack, the brace comprising a snap feature on an inside surface of the frame, the snap feature projecting towards the central opening and a groove on the inside surface of the frame, the groove facing the central opening, the snap feature engaging a first notch of the filter element and the groove receiving a second notch of the filter element such that the snap feature and the groove impede deformation of the filter element.

2. The filter element of claim 1, further comprising a second filter media pack, the filter frame securing the first media pack and the second media pack in a V-shape defining a central inlet between opposing inner faces of the first filter media pack and the second filter media pack.

3. The filter element of claim 2, wherein the first media pack and the second filter media pack are received in the central opening such that the frame surrounds the first filter media pack and the second filter media pack.

4. The filter element of claim 2, wherein the filter element is an inside-out flow filter element, and wherein the brace supports the first filter media pack and the second filter media pack to reduce bowing and/or flexing of the first filter media pack and the second filter media pack during filtering operations.

5. The filter element of claim 1, wherein the central opening is defined by a length, a width, and a height, the length being larger than the width, the width being larger than the height.

6. The filter element of claim 5, wherein the width of the central opening varies across the length.

7. The filter element of claim 6, wherein the width of the central opening is smallest at a center of the length.

8. The filter element of claim 1, wherein the brace further comprises a stabilizer extending from the frame and away from the central opening, the stabilizer configured to interact with a filtration system housing to help stabilize the filter element within the filtration system housing.

9. The filter element of claim 1, wherein the frame is defined by a length, a width, and a height, the length being larger than the width, the width being larger than the height, and wherein the snap feature is formed along the length of the frame adjacent to an intersection of the length and width of the frame.

10. The filter element of claim 1, wherein the second notch received by the groove is part of a side panel of the filter element.

11. The filter element of claim 10, wherein the frame is defined by a length, a width, and a height, the length being larger than the width, the width being larger than the height, and wherein the groove is formed along the length of the frame adjacent to an intersection of the length and width of the frame.

12. The filter element of claim 2, wherein the brace extends between the opposing inner faces of the first filter media pack and the second filter media pack.

13. The filter element of claim 1, further comprising:

a first endcap; and a second endcap;

wherein the first filter media pack is positioned between and coupled to the first endcap and the second endcap.

14. The filter element of claim 13, wherein the brace further comprises a plurality of support tabs extending from the frame and away from the central opening, the plurality of support tabs configured to contact a filtration system housing when the filter element is installed in the filtration system housing.

15. A brace for use with a filter element, comprising:

a frame defining a central opening configured to receive a first filter media pack, the central opening is defined by a length, a width, and a height, the length being larger than the width, the width being larger than the height;

a snap feature on an inside surface of the frame, the snap feature projecting towards the central opening and engaging a first notch of the filter element such that the snap feature impedes deformation of the filter element;

a groove on the inside surface of the frame, the groove facing the central opening, the groove receiving a second notch of the filter element such that the groove impedes deformation of the filter element; and a stabilizer extending from the frame and away from the central opening, the stabilizer configured to interact with a filtration system housing to help stabilize the filter element within the filtration system housing.

16. The brace of claim 15, wherein the width of the central opening varies across the length.

17. The brace of claim 16, wherein the width of the central opening is smallest at a center of the length.

18. The brace of claim 15, wherein the snap feature is formed along the length on the frame adjacent to an intersection of the length and width.

19. The brace of claim 15, wherein the second notch received by the groove is part of a side panel of the filter element.

20. The brace of claim 19, wherein the groove is formed along the length on the frame adjacent to an intersection of the length and width.

* * * * *